(12) United States Patent
Tadrous et al.

(10) Patent No.: US 8,241,403 B2
(45) Date of Patent: Aug. 14, 2012

(54) APPARATUS AND METHOD FOR REGENERATING A CARBON FILTER

(75) Inventors: Ted N. Tadrous, Markham (CA); Shun Hong Long, Newmarket (CA)

(73) Assignee: Catalytic Solutions, Inc., Ventura, CA (US)

( * ) Notice: Subject to any disclaimer, the term of this patent is extended or adjusted under 35 U.S.C. 154(b) by 298 days.

(21) Appl. No.: 12/480,455

(22) Filed: Jun. 8, 2009

(65) Prior Publication Data

US 2010/0307339 A1 Dec. 9, 2010

(51) Int. Cl.
*B01D 46/00* (2006.01)

(52) U.S. Cl. ............ 95/148; 95/278; 95/280; 95/283; 55/302; 55/523; 55/DIG. 30; 96/146

(58) Field of Classification Search ............ 55/282–305, 55/523; 95/278–280; 96/423, 228–233, 96/425–428; 428/116–118; 502/527.19–527.22; 60/311; 422/177
See application file for complete search history.

(56) References Cited

U.S. PATENT DOCUMENTS

| | | | |
|---|---|---|---|
| 4,033,732 A | | 7/1977 | Axelsson et al. |
| 4,730,454 A | * | 3/1988 | Pischinger et al. ............ 60/274 |
| 4,833,883 A | * | 5/1989 | Oda et al. ........................ 60/311 |
| 4,875,335 A | * | 10/1989 | Arai et al. ........................ 60/274 |
| 5,039,347 A | * | 8/1991 | Hindstrom et al. ................ 134/1 |
| 5,065,574 A | * | 11/1991 | Bailey .............................. 60/274 |
| 5,135,580 A | * | 8/1992 | Cantrell et al. ............ 134/22.11 |
| 5,397,550 A | * | 3/1995 | Marino, Jr. ..................... 422/178 |
| 5,853,438 A | * | 12/1998 | Igarashi .......................... 55/302 |
| 6,451,091 B1 | * | 9/2002 | Avina .............................. 95/107 |
| 6,745,430 B2 | * | 6/2004 | Holman et al. ................. 15/304 |
| 7,002,029 B2 | * | 2/2006 | Davis .............................. 554/16 |
| 7,025,811 B2 | * | 4/2006 | Streichsbier et al. ........... 95/279 |
| 7,383,387 B2 | * | 6/2008 | Yankovsky ................... 711/118 |
| 7,410,530 B2 | * | 8/2008 | Wagner et al. .................. 95/280 |
| 7,462,222 B2 | * | 12/2008 | Sellers et al. ................... 95/279 |
| 7,909,916 B2 | * | 3/2011 | Ohya et al. ..................... 95/280 |
| 2002/0157539 A1 | | 10/2002 | Rosenberg |
| 2003/0200746 A1 | | 10/2003 | Saito et al. |
| 2006/0042238 A1 | | 3/2006 | Koga et al. |
| 2006/0201326 A1 | * | 9/2006 | Wagner et al. .................. 95/280 |
| 2008/0173007 A1 | * | 7/2008 | Imes ............................... 60/274 |

OTHER PUBLICATIONS

Diesel Particulate Filter Cleaning Systems and Service, FSX DPF Cleaning—Basic System, Dec. 11, 2008, pp. 1-2, http://www.fsxic.com/site1/Products/BasePkg.html, 2008.
Cleaire Products, Dec. 11, 2008, p. 1, http://www.cleaire.com/web/products/horizon-m.shtml, 2008.

* cited by examiner

*Primary Examiner* — Duane Smith
*Assistant Examiner* — Thomas McKenzie

(57) ABSTRACT

The present invention relates to systems for regenerating a plugged diesel particulate filter (DPF) or catalyzed DPF. In certain embodiments, the system includes a fluid container and pulse valve, a heater, and a blower. Other embodiments include methods of regenerating a plugged DPF by directing a fluid at a first face of a DPF, redirecting the fluid at a second face of the DPF, and in some embodiment, heating the DPF.

26 Claims, 12 Drawing Sheets

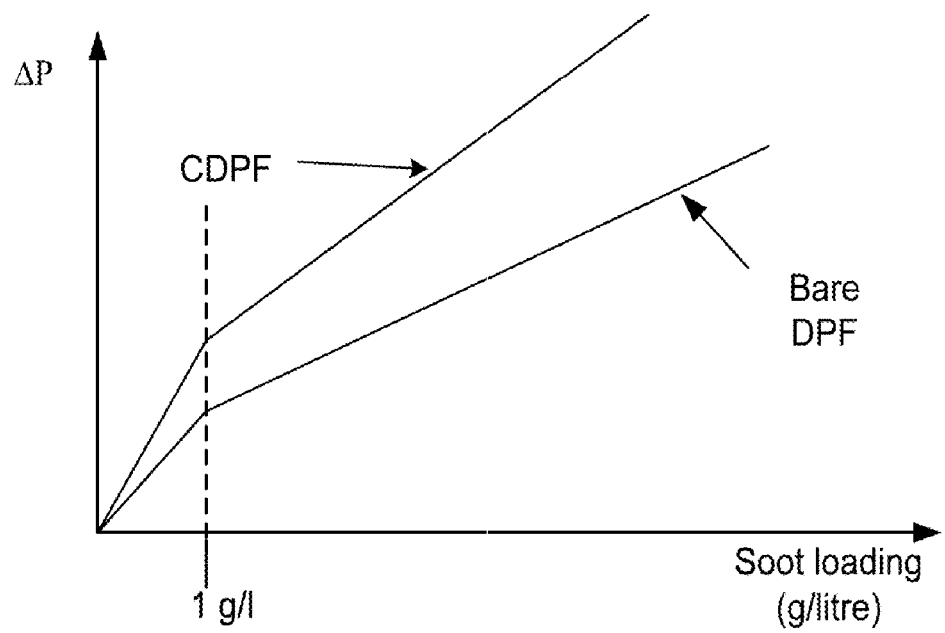
Figure 5 - Pressure drop versus soot loading
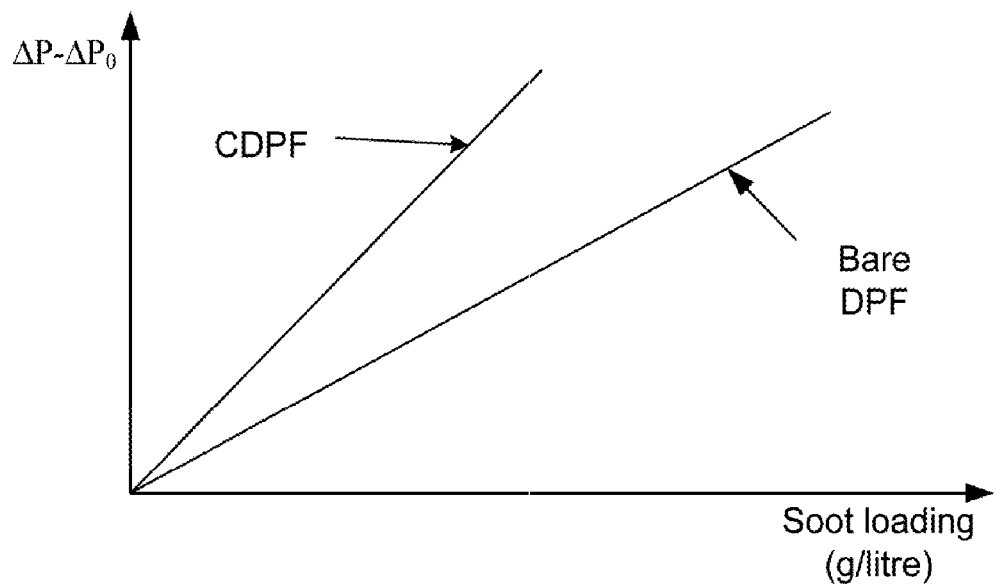
Figure 6 - Modified pressure drop versus soot loading in practice

APPARATUS AND METHOD FOR REGENERATING A CARBON FILTER

FIELD OF THE INVENTION

The present disclosure relates to devices and methods for regenerating a carbon filter. In one embodiment, the carbon filter is a diesel particulate filter (DPF) and the regenerating includes removing soot and ash from the DPF.

BACKGROUND

A filter designed to remove carbon and other waste byproducts from a combustion process including soot, ash and other debris is herein defined as a "carbon filter." Carbon filters of this type are typically made from a high temperature material such as cordierite or silicon carbide. Soot and other byproducts of a combustion process are trapped in the carbon filter instead of being released into an operating environment. A carbon filter includes a diesel particulate filter (DPF) or catalyzed diesel particulate filter (CDPF). As defined in this application, a DPF may or may not include a catalyst. In North America, Europe, and other parts of the world, changing emission standards have resulted in many combustion sources, particularly diesel engines, being fitted with DPFs. The DPF traps soot, ash, and other pollutants from the exhaust of the diesel engine. Catalysts in a DPF may help to reduce soot and pollutants in a DPF. Engine exhaust typically does not heat a DPF sufficiently for soot to burn inside the DPF. A catalyst may help to reduce the soot ignition temperature, allowing a "passive regeneration" process within the normal operating duty cycle of an equipped vehicle (i.e. without removing the DPF from the vehicle). However, there continues to be issues with the passive regeneration approach, including incomplete burning of soot and inability to remove ash.

Soot, ash and other debris continuously accumulate over time inside a DPF. This can have the negative consequences of increased pressure drop across the DPF and reduced efficiency of the catalyst. This can further result in increased backpressure upstream of the filter in the engine, and possibly DPF failure. Ultimately, increased backpressure may cause engine failure.

SUMMARY OF THE INVENTION

Embodiments of the present disclosure include an apparatus and a method of regenerating a carbon filter, for example, a DPF. The method includes placing the carbon filter in a filter receptacle of the apparatus, and the apparatus performing a fluid cleaning program. The fluid cleaning program includes directing the fluid, for example, air, substantially at a first face of the carbon filter, redirecting the fluid substantially at a second face of a carbon filter, and repeating the directing and redirecting alternately for a period of time effective for regenerating the carbon filter.

In one embodiment of the method, the machine further comprises a reservoir tank and a pulse valve in communication with the reservoir tank, and the fluid is air. The reservoir tank contains the air, and the directing includes the pulse valve directing pulses of air at the first face of the carbon filter. The machine further comprises a blower, and the redirecting comprises the blower redirecting air substantially at the second face of the carbon filter. Repeating the directing and redirecting alternately includes alternating between directing pulses of air at the first face, and blowing air at the second face. Once the fluid cleaning program is complete, the method may further include heating the carbon filter.

BRIEF DESCRIPTION OF THE DRAWINGS

FIG. 5 shows the results of a study comparing pressure drop versus soot loading;

FIG. 6 shows the results of a study comparing modified pressure drop versus soot loading;

DETAILED DESCRIPTION

Figure 1:
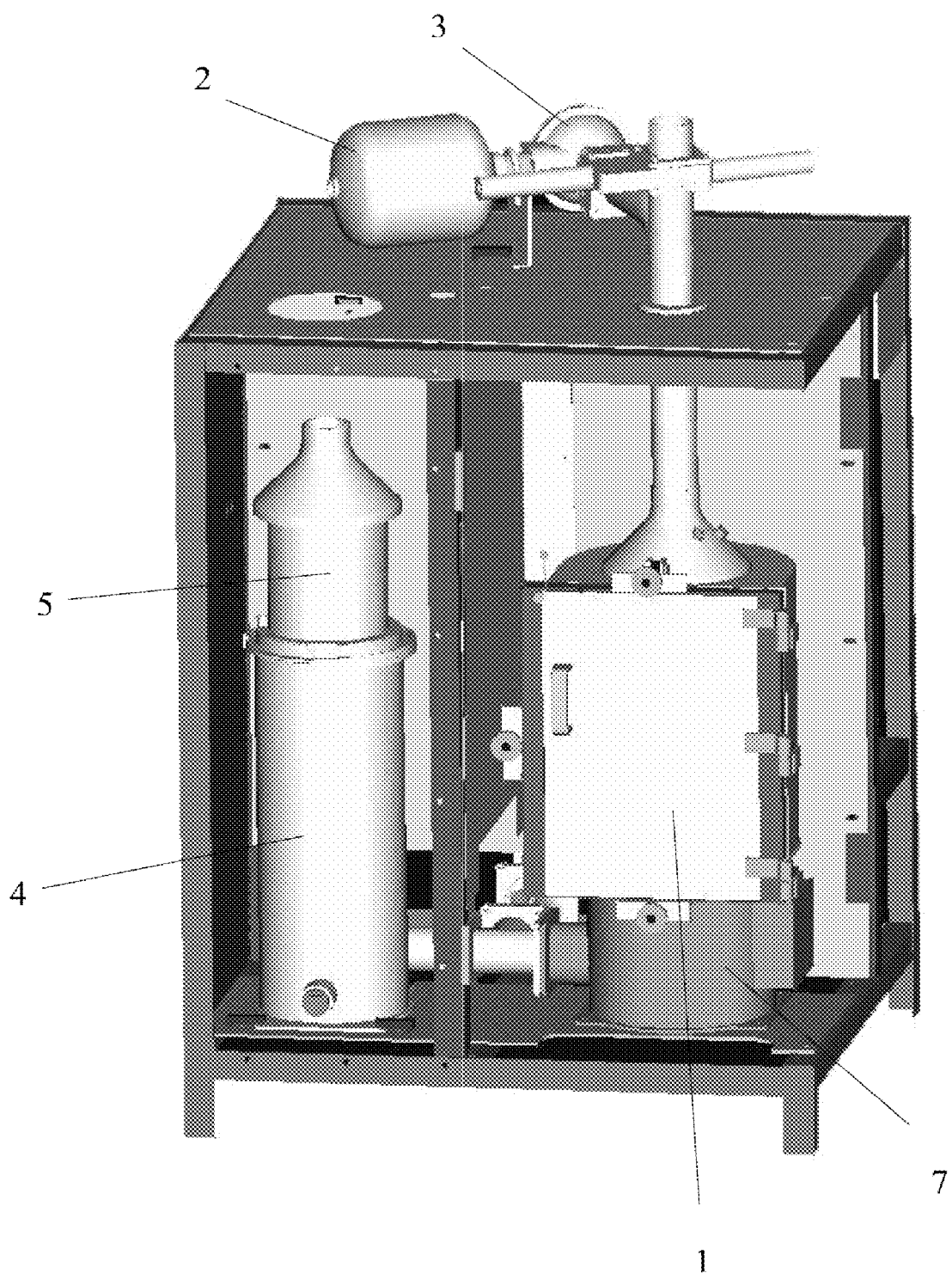
FIG. 1 shows a front view of an embodiment of the apparatus for cleaning a DPF.

Numbers in the present disclosure are rounded to the nearest significant figure using conventional rounding techniques. Ranges of numbers contained herein are understood to contain the numbers on the upper and lower limits, unless otherwise indicated. For instance, a range "from 1 to 10" is understood to include a range including the number "1," and up to and including the number "10."

Carbon Filters and Diesel Particulate Filters

A filter designed to remove carbon and other waste byproducts from a combustion process including soot, ash and other debris is herein defined as a "carbon filter." The present disclosure is directed to devices and methods for regenerating a carbon filter. As used herein, a carbon filter that requires regeneration will be referred to as a "plugged" filter. A plugged filter may require a partial or total regeneration. A plugged filter requiring total regeneration may have 8-10 grams of particulate matter ("PM") per liter of filter volume ("g/L"). The PM is primarily made up of soot and ash. As used herein, "soot" refers to carbonaceous byproducts of a combustion process, for example, a diesel engine. As used herein, "ash" refers to primarily, for example, but not limited to, a non-flammable collection of lube-oil particles and metal particles from engine wear. A partially plugged filter requiring partial regeneration may include a vehicle regenerated filter, which may be loaded with mostly ash, or any filter with less than 8-10 grams/L of PM. In one embodiment, the carbon filter includes a Diesel Particulate Filter (DPF or CDPF). U.S. patent application Ser. No. 11/975,389, filed on Oct. 18, 2007 includes a discussion of DPF's, and is incorporated by reference herein. DPF's are included in, for example, diesel engines to effectively trap particulate matter from diesel engine exhaust.

A DPF may also include a catalyst. The catalyst may help to reduce the soot ignition temperature, allowing for a "passive regeneration" process within the normal operating duty cycle of an equipped vehicle. This is possible because the catalyst reduces the temperature at which the soot combusts to temperatures within the normal operating range of the exhaust system. Unlike a catalytic converter, which is a flow-through device, a DPF cleans exhaust gas by forcing the exhaust to flow through the filter. DPF's with a catalyst may catalyze the exhaust to reduce soot and pollutants.

There are a variety of diesel particulate filter technologies on the market. The most common type of DPF is made of cordierite (a ceramic material that is also used in catalytic converters). Cordierite filters provide excellent filtration efficiency, are relatively inexpensive, and have thermal properties that make packaging them for installation in the vehicle simple. The major drawback is that cordierite has a relatively low melting point (about 1200° C.) and cordierite substrates have been known to melt during filter regeneration. Cordierite filter cores look like catalytic honeycomb-like converter cores that have had alternate channels plugged. The plugs force the exhaust gas flow through the wall and the PM collects in the channels after entering the inlet face.

Another common DPF material is silicon carbide (SiC). It has a higher melting point (2700° C.) than cordierite, and in addition has a higher thermal conductivity. Small SiC cores are made of single pieces, while larger cores are made in segments, which are separated by a special cement that allows heat expansion of the core to be taken up by the cement, and not the segments themselves. Silicon carbide filter cores also look like catalytic honeycomb-like converter cores that have had alternate channels plugged. Again, the plugs force the exhaust flow through the wall and the particulate collects in the channels after entering the inlet face.

As PM accumulates in a DPF, the combustion system's backpressure will rise. If the DPF is not regenerated or replaced, the backpressure may exceed the engine manufacturer's specifications. There are at least two potential consequences for a diesel engine operating at higher backpressure for extended periods. First, engine emissions of certain PM may increase, resulting in accelerated filter plugging due to overloading and the shift of balance point temperature. Operating at increased back pressure may also increase the exhaust gas temperature, resulting in a loss of power due to unsealed (or improperly seated) exhaust valves. This may subject the whole valve assembly to high temperatures leading to aggressive component wear.

U.S. Pat. No. 7,025,811 describes various methods for rejuvenating a DPF and is incorporated by reference herein. Known methods for regenerating a DPF include passive regeneration by an increase in engine exhaust heat that burns off the accumulated soot without removing the filter from the vehicle. Alternatively, the DPF can be removed and "actively regenerated" by external heat sources or other techniques. These techniques include the use of heat and/or compressed air. The soot inside the DPF can be burned off through periodic passive or active regeneration, but the unburnable lube oil-based ash and engine wear metal oxides are not removed by heat, so they continuously accumulate over time inside the DPF. Under exothermic conditions, ash and metal compounds tend to react with the filter material, starting a degradation process that can severely affect the mechanical integrity of the filter. In some cases, the ash and metal oxides can sinter to the DPF material, further damaging the DPF. Ash accumulation competes for filter/catalyst surface area that is primarily dedicated to soot accumulation and conversion. The present application refers to various embodiments of an apparatus and method for effectively removing soot and ash form a carbon filter, for example, a DPF.

Embodiments of the Apparatus of the Present Invention

Embodiments of the cleaning apparatus (i.e. a machine) of the present disclosure include a single system capable of regenerating a plugged filter. The system may include, for example, but not limited to, main sub-systems: fluid cleaning (which may include air pulsing), heating, particle collection and regeneration assessment, all of which may be controllable by a programmable logic controller unit (PLC). An embodiment of such a system is depicted in FIGS. 1 and 2.

Figure 2:
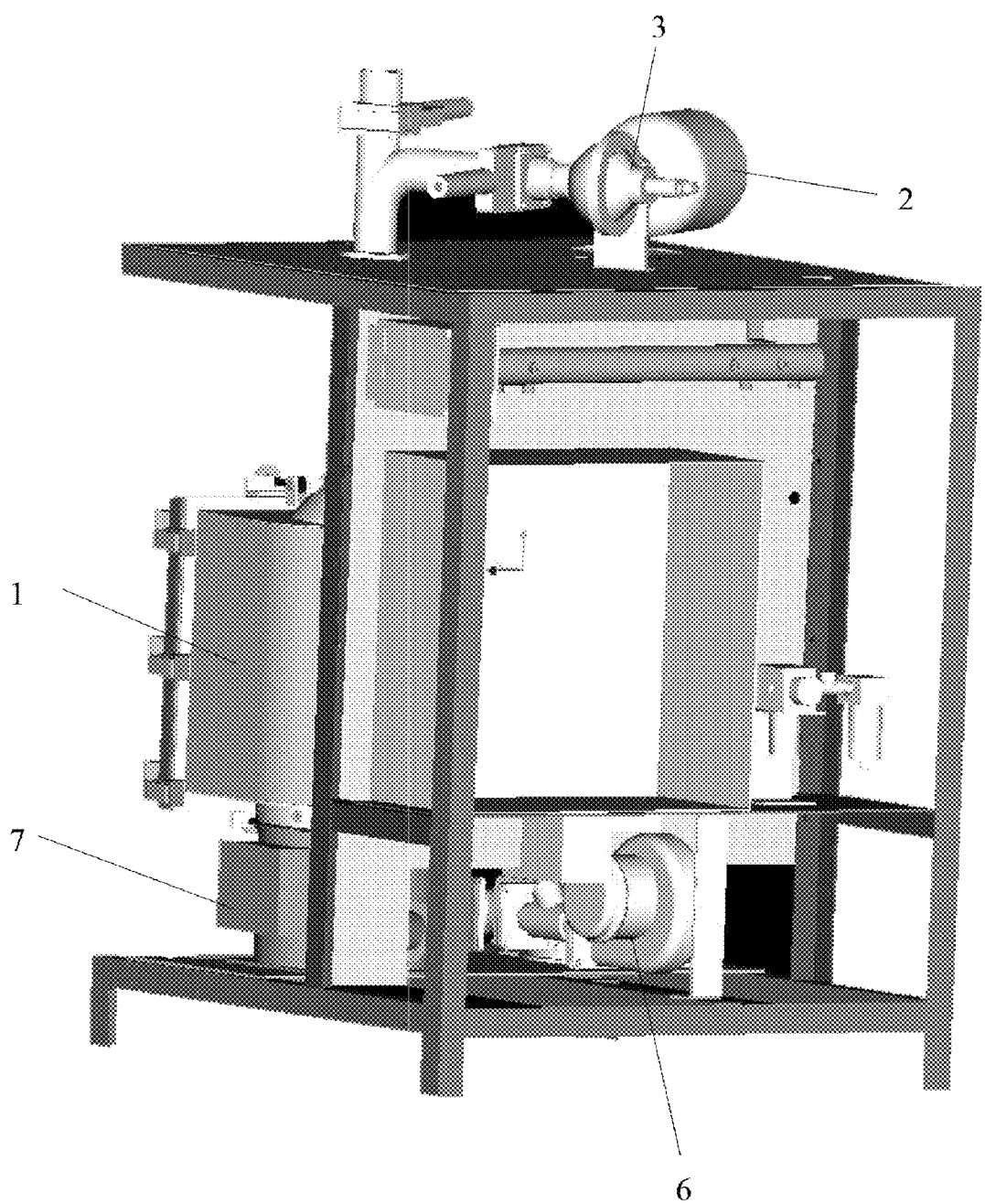
FIG. 2 shows a rear view of an embodiment of the apparatus for cleaning a DPF.
Figure 3A:
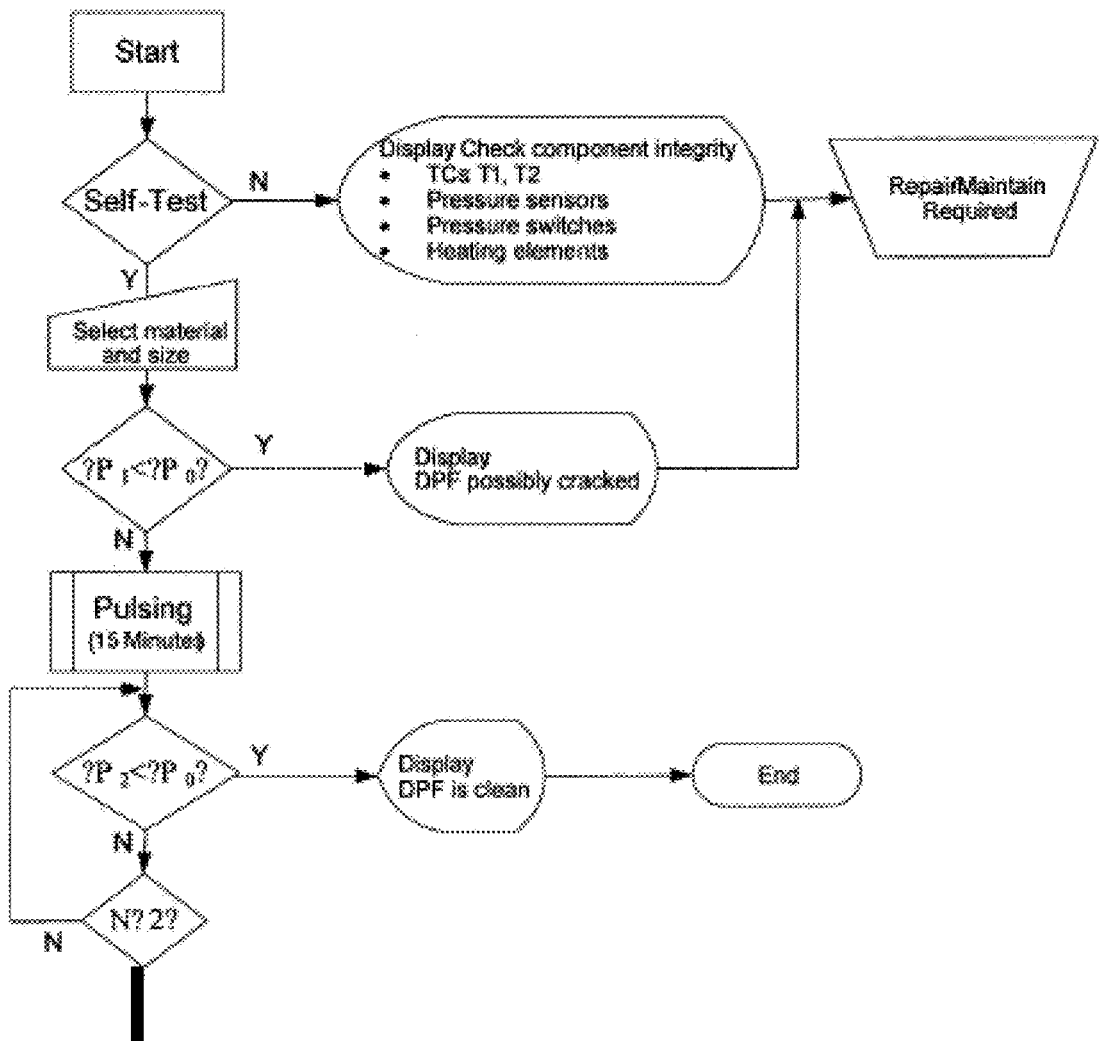
FIGS. 3a and 3b shows a flow chart indicating an embodiment of the method for cleaning a DPF.
Figure 3B:
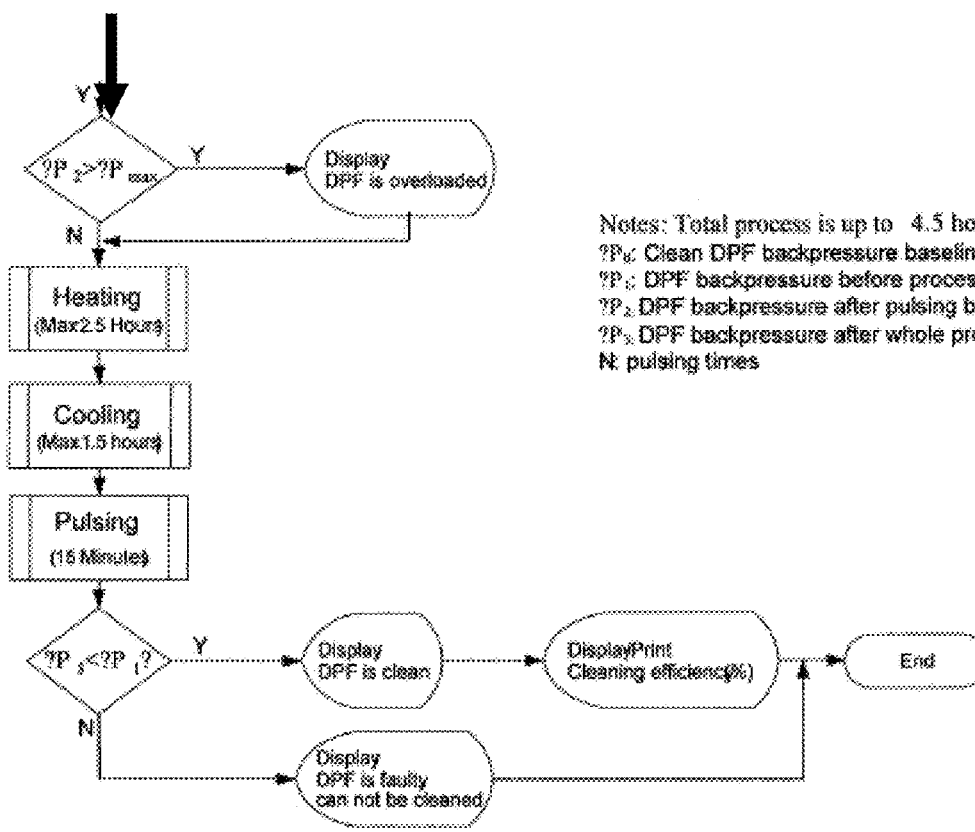

The particular embodiment in FIGS. 1 and 2 includes a filter receptacle 1 where the DPF is placed for cleaning. The embodiment of the apparatus shown in these figures includes an air tank 2 and a pulse valve 3 in fluid communication with the filter receptacle 1. The air tank 2 and pulse valve 3 blow away PM in the DPF including un-burnable ash. In this embodiment, the system is connected to compressed air at a compressed air connector. The compressed air charges the air tank 2, which releases air through the pulse valve 3. The air from the pulse valve 3 is directed at a face of the DPF in the filter receptacle 1. An ash tank 4 collects soot, ash, and other debris from the filter receptacle 1 that is removed from the filter, and the system filter 5 prevents any of these particles from leaving the machine with the vented air. Also included are a blower 6 and various pressure sensors to assess pressure drop at various stages of the regeneration process.

The embodiment depicted in FIGS. 1 and 2 also includes an electric heater 7. The electric heater 7 is controlled by solid state relay (SSR) for quick on/off switching and smooth temperature ramping control. In certain embodiments, there are two type-K thermocouples built into the heating sub-system: one is near the heating element at the DPF inlet to control influx temperature for the DPF (T1), and another is near the outlet of the DPF to monitor the outlet air temperature during heating regeneration (T2). The PLC may employ a double closed-loop temperature control to protect both the heater element and the DPF by minimizing thermal shock during heating and cooling cycles.

Generally, operation of the DPF regeneration apparatus includes removing the DPF from vehicle and placing it into the filter receptacle of the apparatus. In one embodiment, the apparatus runs a self-test program to ensure power and a proper fluid source. The apparatus detects how plugged the DPF is (PM loading) before the regeneration process begins. This detection may be carried out by any suitable means such as, for example, but not limited to, weighing the DPF, evaluating pressure drop across the DPF, RF signal attenuation, x-ray, sonogram, CT scan, MRI, analysis of a fluid after passing through the carbon filter such as diffractive analysis and combinations of any thereof. Through any of these or other suitable methods, the machine may indicate to the operator that the DPF is plugged and regeneration is required, or that the DPF is possibly cracked or damaged and the integrity of the DPF should be checked.

If the DPF is plugged beyond a threshold amount of PM, then the machine does not perform a fluid cleaning program. Running the machine above above a threshold amount of PM may risk the integrity of the DPF. Heating a DPF above this threshold may cause uncontrolled combustion, increasing core temperature to levels approaching the melting temperature point of the DPF material. In one embodiment, the maximum PM loading is about 10 grams per liter. In certain embodiments, maximum PM loading is about 6 grams/liter for a cordierite DPF, and 8 grams/liter for a silicon carbide DPF.

If the DPF is not damaged and the DPF is not plugged beyond a threshold amount, then the machine performs a fluid cleaning program. After the fluid cleaning program, the machine checks the PM loading again. If the PM loading is lower than a predetermined standard PM loading, the machine indicates that the DPF is clean. Otherwise, the machine may run a heating program or a fluid cleaning program again.

In certain embodiments the fluid cleaning program includes pulsing a fluid such as air at a face of the DPF. The pulsing fluid is generated by a pulse valve. In other embodiments, the fluid is also blown at the opposite face of the DPF by a blower. In further embodiments, the fluid cleaning program alternates pulsing and blowing. In alternative embodiments, pulsed air is directed alternately at both faces of the DPF.

If a fluid cleaning program is not sufficient to regenerate the filter, the machine may run a heating program to burn off any soot in the DPF, followed by a cooling program. When heat is applied, the soot in the DPF may burn releasing more heat and byproducts such as, for example, $CO_2$, CO and water. It has been discovered that before heating, it is necessary to first perform a fluid cleaning program to redistribute/remove dense pockets of soot within the DPF. This redistribution allows for substantially even heating when heat is applied. If heat is applied before first directing a fluid into the DPF, the uneven distribution of soot inside the DPF may cause uneven heating or runaway exothermic reactions, potentially damaging the DPF. The DPF swells when heated, and uneven heating can cause uneven thermal expansion, which can cause cracks and other damage. This may be referred to as "thermal shock."

The heating program may blow a heated fluid such as air into the filter. A cooling program cools the filter from a heating temperature to a safe handling temperature. After being heated and cooled, the machine may run another fluid cleaning program and check PM loading. If PM loading is less than a standard PM load, then the DPF is clean. The standard PM load is an experimentally determined acceptable amount of PM remaining in a regenerated filter. The machine may also indicate if the filter is partially regenerated, not regenerated, or damaged. Further embodiments include additional heating and fluid cleaning programs.

Embodiments of the Method of the Present Invention

Embodiments of the present disclosure also include a method of regenerating a carbon filter. The methods may include placing the carbon filter in a filter receptacle of an apparatus comprising a container of a fluid. In one embodiment, this fluid includes air. These methods further include performing a fluid cleaning program, which includes directing the fluid substantially at a first face of the carbon filter, and redirecting the fluid substantially at a second face of a carbon filter. These methods still further include repeating the directing and the redirecting alternatively for a period of time effective for regenerating the carbon filter. In one embodiment, the carbon filter is a diesel particulate filter. In other embodiments, the carbon filter is any carbon filter for filtering PM. In still other embodiments, the carbon filter includes filters from industrial stack scrubbers for boilers, any burner, or a turbine.

It has been surprisingly and unexpectedly discovered by the present inventors that the use of a pulse valve is unexpectedly more effective than using a compressed air nozzle to remove PM from a DPF. I has also been surprisingly and unexpectedly discovered that repeating the directing and redirecting alternately of a fluid at alternate first and second faces of a carbon filter during the fluid cleaning program increases the amount of soot and ash removed from the filter. The inventors conducted experiments comparing first a DPF cleaned with one-directional pulsed flow, compared to utilizing repeating the directing and redirecting alternately starting from same accumulated mass. Results with repeating the directing and redirecting alternately showed significant increase in ash and soot removal from the filter. The removal amount may characterized as regeneration efficiency.

In certain embodiments, the repeating the directing and redirecting alternately comprises directing fluid at a first pressure at a first face, and redirecting fluid at a second pressure at a second face, and repeating alternately, wherein the first pressure is greater than the second pressure. In certain embodiments, the repeating the directing and redirecting alternately comprises directing pulses of a fluid from a pulse valve at a first face, and redirecting fluid from a blower at a second face, and repeating alternately. In other embodiments, the repeating the directing and redirecting alternately comprises directing pulses of a fluid from a pulse valve at a first face, and redirecting pulses of a fluid from a pulse valve at a second face.

In certain embodiments, the container includes a reservoir tank, and the machine further includes a pulse valve in fluid communication with the reservoir tank. In certain embodiments, the reservoir tank is a 2-gallon tank. The reservoir tank includes the fluid, and directing the fluid includes the pulse valve directing pulses of the fluid substantially at the first face of the carbon filter. In some embodiments the fluid includes air and the reservoir tank is charged with air from a source of compressed air selected from shop air and a compressor built onto the machine. In other embodiments, the tank is charged with compressed air at a pressure of from about 90 to about 125 psi. In a further embodiment, the pulse valve directs pulses of the fluid substantially at the first face of the carbon filter when the tank pressure rises to a pressure from about 40 to 125 psi. In certain embodiments, this is achieved with a "popup valve," and the tank pressure at which the valve releases is called the "valve popup pressure." In another embodiment, the valve popup pressure is from about 60 to 80 psi, and in still other embodiments the valve popup pressure is about 60 psi. In some embodiments, the machine will shut off if the compressed air is at a pressure of less than 90 psi. In certain embodiments, the pulse valve releases about 0.0452 kg of air in every discharge.

In some embodiments, the directing comprises at least one pulse. In further embodiments, the directing comprises at least about 10 seconds, wherein the pulse valve fires for at least about 0.02 seconds and further comprising at least about 1 second in between pulses. In other embodiments, the directing comprises from about 10 seconds to one minute, wherein the pulse valve fires for from about 0.02 to 0.08 seconds and further comprising from about 0.25 to 5 seconds in between pulses. In another embodiment, the directing comprises at least about 30 seconds, wherein the pulse valve fires for at least about 0.05 seconds and further comprising at least about 3 seconds in between fires, and still further wherein the pulse valve fires at least about 10 times during the at least about 30 seconds.

In some embodiments, the apparatus further comprises a blower, and redirecting the fluid includes the blower redirecting the fluid substantially at the second face of the carbon filter. In certain embodiments, the redirecting comprises the blower redirecting the fluid, measured at a pressure from 0.5 to 20 psi at the filter face. In another embodiment, the redirecting comprises the blower redirecting the fluid at a pressure from 1 to 5 psi measured at the filter face. In certain embodiments, the redirecting comprises at least 2 seconds. In other embodiments, the redirecting comprises at least 10 seconds.

In one embodiment, the fluid cleaning program comprises at least 5 minutes. In other embodiments, the fluid cleaning program comprises at least 15 minutes. In a further embodiment, the fluid cleaning program comprises about 15 minutes, the fluid cleaning program repeatedly alternating between the directing comprising about 30 seconds and the redirecting comprising about 10 seconds. In certain embodiments, the directing comprises about 30 seconds, and during the redirecting the blower runs for about 10 seconds, for a total fluid cleaning program 15 minutes in duration. In this embodiment, the total running time of the blower may be about 3 min and 45 sec.

In another embodiment, the first face is an outlet face of the carbon filter, and the second face is an inlet face of the carbon filter. As used herein, an inlet face refers to the face where internal combustion engine exhaust or other stack exhaust gases enter the filter during use, and an outlet face refers to the face where the exhaust or gases exit the filter. In a further embodiment, the filter is oriented vertically within the machine, with the inlet face as the bottom face and the outlet face as the top face. In certain embodiments, the pulsed fluid may be directed from substantially above the carbon filter (at the outlet face), and the blower redirects the fluid from substantially below the carbon filter (at the inlet face).

In certain embodiments of the present disclosure, the method further includes heating the carbon filter. In these embodiments, the machine includes a heating source. In certain of these embodiments, the heating comprises blowing a heated fluid into one of a first and a second face of the carbon filter. In one embodiment, heat is applied from substantially below the carbon filter (at the inlet face). In certain embodiments, the apparatus comprises a ceramic-lined kiln. In these embodiments, the placing includes placing the carbon filter in a ceramic-lined kiln comprising the filter receptacle. In certain embodiments, the fluid cleaning program comprises fluid cleaning and the heating at substantially the same time. In these embodiments, the carbon filter is heated simultaneously while the machine provides repeated and alternating directing and redirecting fluid directed at the first face and the second face respectively. In certain of these methods, the machine may include a heating source selected from the group consisting of electric, syngas, plasma, microwave, fuel burner, and combinations of any thereof.

As used herein, syngas (from synthesis gas) refers to a gas mixture that contains varying amounts of carbon monoxide and hydrogen. Examples of production methods for syngas include steam reforming of natural gas or liquid hydrocarbons to produce hydrogen, the gasification of coal and in some types of waste-to-energy gasification facilities. The name comes from their use as intermediates in creating synthetic natural gas (SNG) and/or for producing ammonia or methanol.

In certain embodiments, a blower blows a fluid such as air across an electric heater, heating the fluid. The blower further blows the fluid at a face of the carbon filter, thereby heating the filter. In certain embodiments, a blower blows a heated fluid into one of a first and a second face of the carbon filter. Heating the carbon filter may cause the soot and other PM in the filter to combust, causing combustion byproducts to exit the filter such as, for example, $CO_2$, CO and water. Heating also may combust absorbed hydrocarbon compounds on the filter and/or catalyst surface. These absorbed hydrocarbons may mask the catalyst active sites, and heat treatment may help to rejuvenate catalyst activities. If the filter is used on an internal combustion engine running on fuel containing sulfur, sulfate forms on the filter surface as part of the total PM and masks the catalyst active sites. Heat treatment then also decomposes the sulfate and regenerates the catalyst surface, restoring filter/catalyst performance.

When heating a carbon filter that also includes a catalyst, for example DPF's, it is important not to overheat the filter. Temperatures that are too high can damage the DPF material, for example by thermal shock, and cause ash and metal particles to sinter to the DPF, fouling the catalyst. In certain embodiments, heating the carbon filter includes heating the carbon filter to a maximum inlet face temperature of less than about 650° C. Controlling the inlet face temperature in addition to monitoring the outlet temperature enables the machine to control the core temperature to less than 1000° C. by closed-loop control. (See Example 4)

Thermal shock is the name given to cracking as a result of rapid temperature change. Thermal shock occurs when a thermal gradient causes different parts of an object to expand by different amounts and/or rates. This differential expansion can be understood in terms of stress or of strain. At some point, the stress overcomes the strength of the material, causing a crack to form. If nothing stops this crack from propagating through the material, it will cause the object's structure to fail. Controlling the heating rate of the carbon filter to provide for uniform expansion can avoid thermal shock. In some embodiments, the heating includes increasing the temperature of the blowing heated fluid at a rate of from 5 to 17° C. per minute up to a maximum core temperature. As used herein, maximum core temperature is the highest core temperature desirable to combust soot and yet prevent thermal shock. In certain embodiments of the present disclosure, maximum core temperature is about 650° C. In general, it is desirable to keep the core temperature below 1000° C. In other embodiments, the blowing heated fluid increases in temperature at a rate of from about 7 to about 10° C. per minute up to a maximum core temperature. In further embodiments, the temperature of the blowing heated fluid is increased at a maximum rate sufficient to heat the filter without risking damage from thermal shock.

In order to maximize combustion of soot and other PM in a carbon filter, it may be necessary to soak the filter at a temperature. As used herein, the term "soak" means to hold the filter at approximately the same temperature for a set amount of time. In certain embodiments, heating the carbon filter includes soaking the carbon filter at the maximum core temperature, or a temperature less than the maximum core temperature, for at least about 10 minutes. In certain other embodiments, heating the carbon filter includes soaking the carbon filter at the maximum core temperature for at least about 30 minutes. In other embodiments, heating the carbon filter includes soaking the carbon filter at the maximum core temperature for from about 1 to about 2 hours. In still other embodiments, heating the carbon filter includes soaking the carbon filter at a temperature of about 650° C.

Thermal shock is also an issue once heating a carbon filter has been completed and the filter begins to cool. Cooling rates that are too high can cause uneven contraction of the filter and consequently, thermal shock. In some embodiments, once the filter has been soaked at the maximum core temperature, the method further includes cooling the carbon filter from the maximum core temperature to less than about 50° C. at a rate of from about 5 to 17° C. per minute. In other embodiments, the method includes cooling the carbon filter from the maximum core temperature to less than about 50° C. at a rate of from about 10 to about 12° C. per minute. In certain embodiments, cooling rate is controlled by a combination of reducing power to the heater, blowing a fluid with a blower with the heater completely off, and directing compressed air at a face of the filter. This combination of methods is controlled by the machine to effect the proper cooling rate.

In certain embodiments of the present disclosure, the carbon filter is heated, causing soot and other PM to combust. This combustion may be somewhat unpredictable. Left unchecked, burning soot may cause a runaway exothermic reaction, permanently damaging the filter. In certain embodiments of the present disclosure, the heating is stopped when the temperature of the fluid exiting the carbon filter increases at a rate greater than about 10° C. per second. In other embodiments, the blower is turned off in addition to stopping the heat. Removing heat, oxygen, or both may slow the exothermic reaction before damage occurs. This may be accomplished by monitoring T1 and T2 in a closed loop controlled by a PLC.

As described herein, it may be desirable to soak a carbon filter at a certain core temperature. However, it may not be possible to know the temperature at the core at any given time. Thus, the core temperature may be modeled based on exit temperature and soot load (see the examples, herein). Exit temperature may be determined by a thermocouple at the outlet end of the carbon filter. Soot load may be determined by using a blower to blow air through a filter and measure a pressure drop. This blower may be the same blower that directs heated air at the carbon filter, and thus, pressure drop can be continuously or intermittently monitored.

As soot and other PM combust within a filter, heat is generated beyond the heat being added to the filter by the heated fluid. Some of this heat escapes at the opposite end of the filter, while some of the heat may be absorbed by the filter itself. More heavily plugged filters contain more soot, and consequently generate more heat. Initially, then, the outlet temperature of a more plugged filter may need to be controlled at a lower temperature relative to a less plugged filter. As the soot burns, however, less heat is generated from within the filter. The reduction in soot may be detected during the heating cycle by the pressure differential, and the outlet temperature may be allowed to rise. In this manner, core temperature may be controlled in order to avoid overheating the filter. An example of soot load vs. outlet temperature determination is contained in the examples.

As discussed herein, when the filter has been placed in the apparatus, PM loading is measured to determine if the plugged filter is suitable for regeneration. In certain embodiments, the method further includes measuring PM loading in order to detect when the carbon filter has been regenerated. In these embodiments, after or during heating and/or cooling, the method may include measuring PM loading. If the PM loading is above a standard PM loading, the filter has not been regenerated and may need to be cycled through fluid cleaning program and/or a heating program again. Therefore, certain embodiments further comprise performing the fluid cleaning program, and/or the heating program again. If the PM loading is below a standard PM loading, the filter may be regenerated and may not need to be cycled through the method again.

Alternative methods of detecting when the carbon filter has been regenerated include RF signal attenuation, x-ray, sonogram, CT scan, MRI, weight measurement, analysis of a fluid after passing through the carbon filter such as diffractive analysis and combinations of any thereof.

In the embodiments previously described herein, the fluid cleaning program was described as a separate program from the heating and cooling program. However, in another embodiment, the fluid cleaning program includes the heating and/or cooling program. In other words, while the system is alternating directing and redirecting air at the carbon filter, it is also heating and/or cooling the carbon filter without a separate heating/cooling program. This may serve to decrease the cleaning cycle time.

The fluid referred to herein may include, for example, without limitation, a compressible fluid, any inert gas, air, nitrogen, oxygen, argon, water, saline, steam, and mixtures of any thereof.

Figure 11:
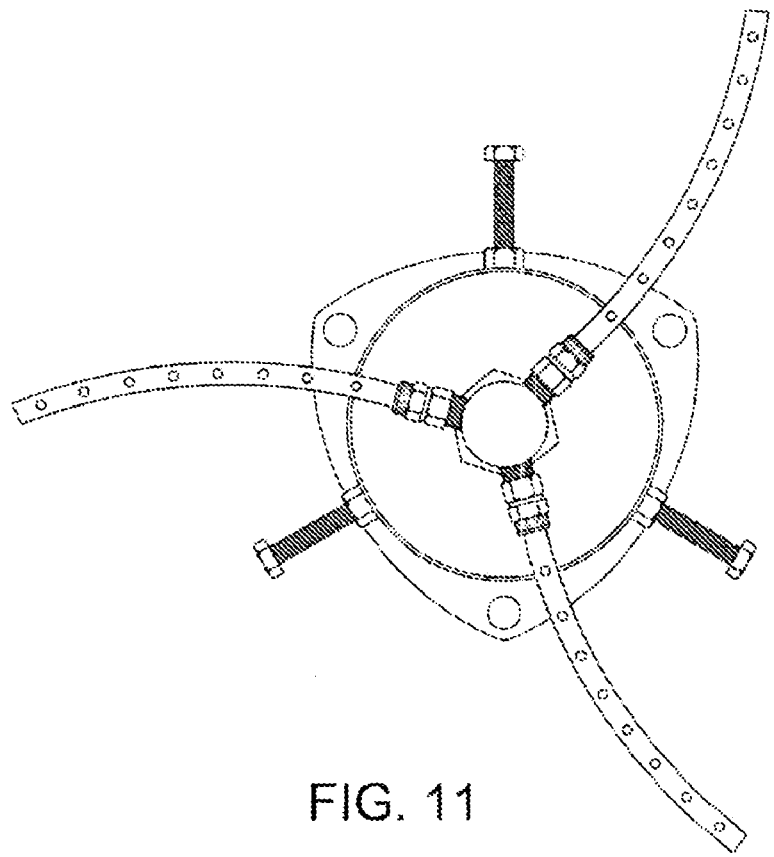
FIG. 11 is a picture of a rotary swivel multi-orifice nozzle compressed air dispenser.

In other embodiments of the present disclosure, the directing includes use of a rotary nozzle with a plurality of arms as an alternative to a pulse valve. The plurality of arms comprise a plurality of appertures. The arms are connected to a central "hub" that spins. The hub itself attaches to the nozzle base by a hub extension. See FIG. 11. The hub is in fluid communication with a fluid source, and further directs the fluid into the arms. As fluid exits apertures in the arms, the hub/arm assembly spins.

In certain embodiments, the DPF is a cylinder including a first face and a second face. In some embodiments, a conical flange is attached to a first or second face. When installed on a vehicle, this flange serves to adapt the DPF to the smaller diameter of the other exhaust components. The pulse valve and rotary nozzle embodiments described herein may direct fluid from just outside the conical flange. When outside the conical flange, the pulse valve or rotary nozzle may be from about 15-25 inches from the first face. The rotary nozzle embodiments, however, may include a plurality of arms that are flexibly attached to the hub. This arrangement allows the hub and arms to be compressed and placed inside the conical flange. Once inside the conical flange, the arms resume their normal configuration. The arms may be formed from any suitable material, including a flexible plastic, or metal arms, such as aluminum, that are attached the hub by springs, for example. One of ordinary skill may contemplate other methods of achieving this functionality. During operation, this allows the arms to rotate on a plane much closer to the first face of the DPF, inside the conical flange. In certain embodiments, the arms of the rotary nozzle may be from about 0.5-3 inches from the first face. In other embodiments, the arms of the rotary nozzle may be about 1 inch from the first face.

In the embodiments including a rotary nozzle, the fluid pressure communicating from the source, through the hub extension, the hub, and the arms is constant. In other words, there is no pulsing or deliberate fluctuation in the fluid pressure to the nozzle. As the arms rotate, however, the apertures of the arms sweep across the face of the DPF, creating variations in fluid pressure at the face as the arms rotate. It has been surprisingly discovered that this method of pressure fluctuation is also effective at removing PM from a DPF. In addition, a machine including a rotary nozzle does not need a separate air tank that is required for the pulse valve.

The following examples are intended to illustrate, but not to limit, the scope of the invention. It is to be understood that other procedures known to those skilled in the art may alternatively be used.

EXAMPLES

Example 1

Comparison of Methods of Directing a Fluid

Various nozzle configurations were prepared and tested in order to compare cleaning efficiency. Plugged filters were prepared in the laboratory. A representative artificial ash having similar particle size range as actual PM found in dirty DPF's was used. Each DPF sample was loaded with 120 grams of ash and 30 grams of carbon black. The mixture was evenly distributed over the DPF inlet face and allowed to fill the channels by gravity. The ash was then pushed into the channels using standard shop air compressed nozzle. Finally, the DPF was installed on a DDC S50 engine running for one hour.

Figure 10:
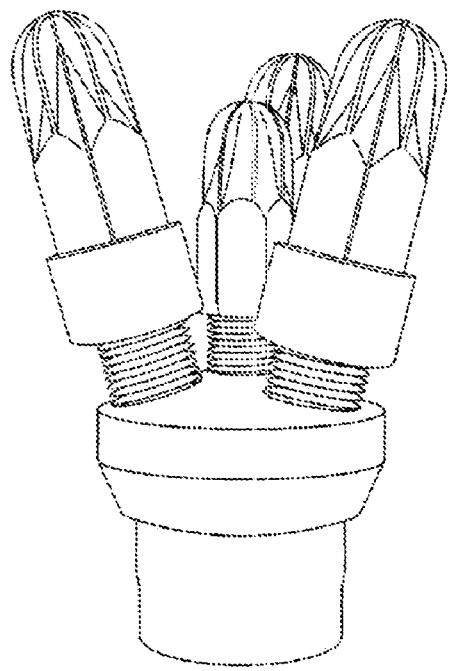
FIG. 10 is a picture of a 4-nozzle bundle compressed air dispenser.
Figure 12A:
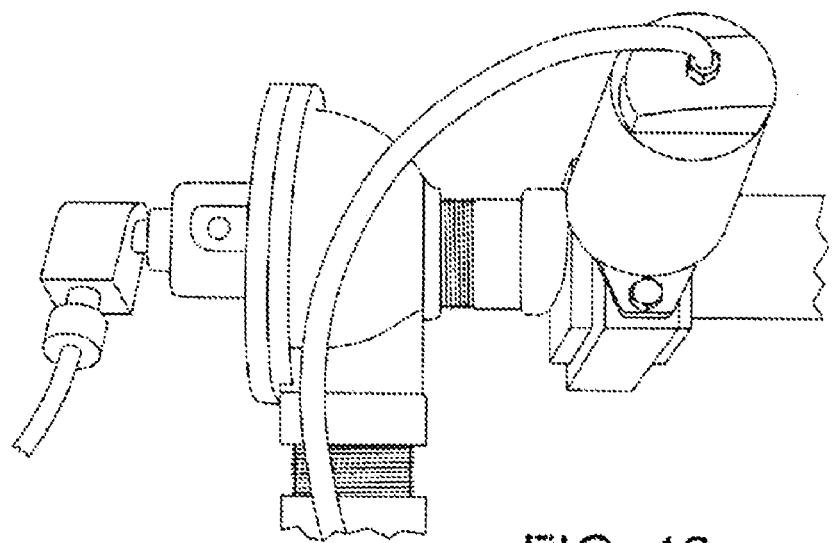
FIGS. 12a-c are pictures of a pulse valve.

Five ash removal methods were tested where the various nozzles provided greater than about 90% DPF face coverage:
1. 4-Nozzle bundle—continuous compressed air flow placed about 5-7 inches from the face of the DPF (see FIG. 10)
2. 4-Nozzle bundle—pulsed compressed air flow placed about 5-7 inches from the face of the DPF (see FIG. 10)
3. Rotary swivel multi-orifice nozzle—continuous compressed air flow placed about 1 inch from the face of the DPF (see FIG. 11)
4. Rotary swivel multi-orifice nozzle—pulsed compressed air flow placed about 1 inch from the face of the DPF (see FIG. 11)
5. Pulse valve and compressed air discharge tank—placed about 12 inches from the face of the DPF (see FIGS. 12a-c)

Configurations 1 and 2 were the same, with the difference being a solenoid valve controlling the pulsing in configuration 2. Otherwise, these configurations essentially comprised 4 compressed-air nozzles bundled together. The DPF's tested in Example 1 had a diesel oxidation catalyst (DOC) attached to and downstream from the DPF. In this Example, a vacuum was used to remove particulate matter in between the DPF and the DOC. In certain other embodiments described herein, a vacuum is not used. Following is a glossary of terms used in Table 1:

Feed Air Pressure to Nozzle—pressure of shop air (compressed air) that nozzle bundle was connected to;
Pulse [Freq/Duration]—frequency and duration of the pulse;
Air Outlet—type of air outlet directing fluid to the filter face;
Air Flow (cfm@100 psi)—volume of air exiting the nozzle bundle as given by the nozzle manufacturer;
Air Flow (cfm@atm P)—volume of air exiting nozzle bundle calculated at atmospheric pressure;
Rotation—rotation of the nozzle bundle;
Distance from the Outlet Face—distance of the outlet of the nozzle bundle to filter face;
Vacuum Power—power of the vacuum pump;
Vacuum Location—location where vacuum was applied; "mid assembly" is a point in between the DPF and DOC;
Vent Position—position of a vent in between DPF and DOC;
Assembly Orientation—indicates the position of the nozzle bundle and filter; when vertical, the nozzle assembly directed air downward at the filter face; when vertical, the nozzle assembly directed air horizontally at the filter face;
Ash Loading Air Pressure—pressure of air used to pack the filter with ash before testing;
Initial PM Loading—initial amount of PM in the filter before testing;
Total PM Removed—total amount of PM removed during testing;
Cleaning Efficiency—efficiency at removing PM during testing.

TABLE 1

Data showing the results of Example 1 testing Concept 1 and 2 (4-Nozzle Bundle)

|  | Test 1 Concept 1 | Test 2 Concept 2 | Test 3 Concept 1 | Test 4 Concept 2 | Test 5 Concept 1 | Test 6 Concept 2 | Test 7 Concept 1 | Test 8 Concept 2 |
|---|---|---|---|---|---|---|---|---|
| Feed Air Pressure to Nozzle (psi) | >115 psi | | >115 psi | | >115 psi | | >115 psi | |
| Pulse [Freq/Duration] (sec) | 0/0 | | 1/1 | | 0/0 | | 1/1 | |
| Air Outlet | 4-Nozzle Cluster | | 4-Nozzle Cluster | | 4-Nozzle Cluster | | 4-Nozzle Cluster | |
| Air Flow (cfm@ 100 psi) | 63 | | 63 | | 63 | | 63 | |
| Air Flow (cfm@ atm P) | 756 | | 756 | | 756 | | 756 | |
| Rotation (rpm) | none | | none | | none | | none | |
| Distance from Filter Face (inches) | 7 | | 5 | | 5 | | 5 | |
| Vacuum Power (hp) | 11.5 | | 11.5 | | 11.5 | | 11.5 | |
| Vacuum Location | Mid Assembly | | Mid Assembly | | Mid Assembly | | Mid Assembly | |
| Vent Position | Open | | Open | | Open | | Open | |
| Assembly Orientation | Horizontal | | Horizontal | | Vertical | | Vertical | |
| Ash Loading Air Pressure [psi] | 100 | | 100 | 20 | 20 | | 20 | |
| Initial PM Loading (g) | 192 | 180 | 177 | 190 | 210 | 231 | 230 | 186 |
| Total PM Removed (g) | 7 | 63 | 7 | 95 | 107 | 134 | 165 | 86 |
| Cleaning Efficiency | 4% | 35% | 14% | 51% | 51% | 58% | 72% | 46% |

Configurations 3 and 4 are a rotary nozzle-type system, with the difference being pulsing in configuration 4. Data relating to comparison of these methods is shown in Table 2.

TABLE 2

Data showing the results of Example 1 testing Concept 3 and 4 (Rotary Swivel Multi-Orifice Nozzle)

|  | Test 1 Concept 3 | Test 2 Concept 4 | Test 3 Concept 3 | Test 4 Concept 4 | Test 5 Concept 3 | Test 6 Concept 4 | Test 7 Concept 3 | Test 8 Concept 4 |
|---|---|---|---|---|---|---|---|---|
| Feed Air Pressure to Nozzle (psi) | >115 psi | | >115 psi | | >115 psi | | >115 psi | |
| Pulse [Freq/Duration] (sec) | 0/0 | | 1/1 | | 0/0 | | 1/1 | |

TABLE 2-continued

Data showing the results of Example 1 testing Concept 3 and 4 (Rotary Swivel Multi-Orifice Nozzle)

|  | Test 1 | Test 2 | Test 3 | Test 4 | Test 5 | Test 6 | Test 7 | Test 8 |
|---|---|---|---|---|---|---|---|---|
|  | Concept 3 | | Concept 4 | | Concept 3 | | Concept 4 | |
| Air Outlet | Rotary Nozzle | | Rotary Nozzle | | Rotary Nozzle | | Rotary Nozzle | |
| Air Flow (cfm@ 100 psi) | 64 | | 64 | | 64 | | 64 | |
| Air Flow (cfm@ atm P) | 768 | | 768 | | 768 | | 768 | |
| Rotation (rpm) | 1300 | | 1100 | | 1300 | | 1100 | |
| Distance from Filter Face (inches) | 1 | | 1 | | 1 | | 1 | |
| Vacuum Power (hp) | 11.5 | | 11.5 | | 11.5 | | 11.5 | |
| Vacuum Location | Mid Assembly | | Mid Assembly | | Mid Assembly | | Mid Assembly | |
| Vent Position | Open | | Open | | Open | | Open | |
| Assembly Orientation | Horizontal | | Horizontal | | Vertical | | Vertical | |
| Ash Loading Air Pressure (psi) | 20 | | 20 | | 20 | | 20 | |
| Initial PM Loading (g) | 195 | 187 | 205 | 193 | 209 | 208 | 211 | 213 |
| Total PM Removed (g) | 158 | 139 | 129 | 113 | 152 | 154 | 192 | 190 |
| Cleaning Efficiency | 81% | 74% | 63% | 59% | 73% | 74% | 91% | 89% |

Figure 12B:
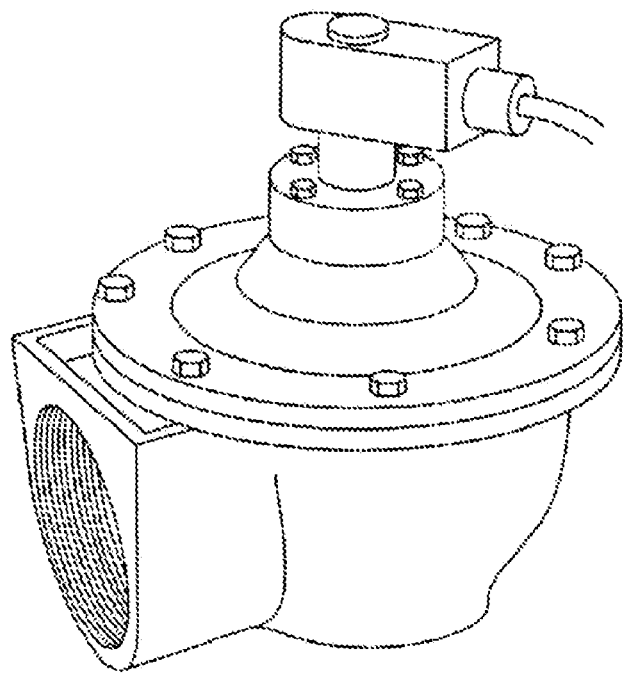
Figure 12C:
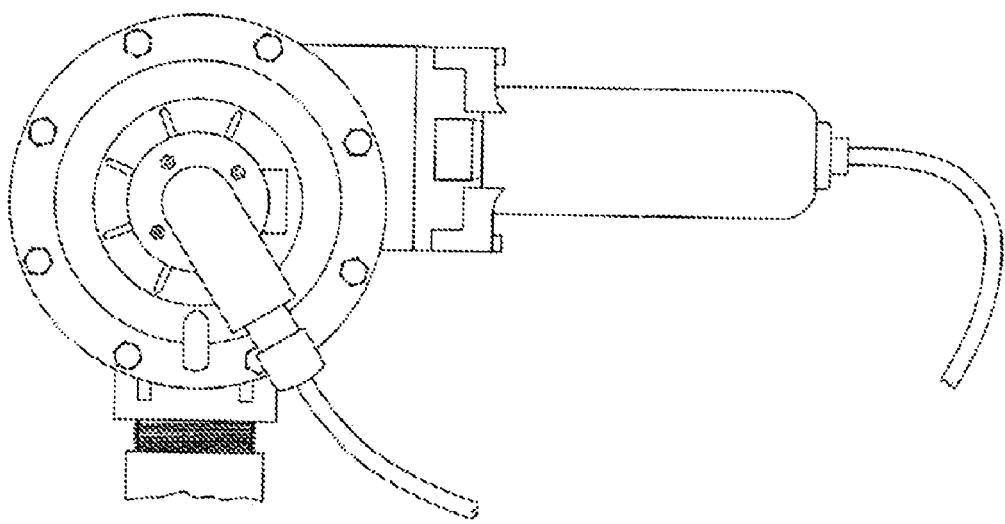

Configuration 5 was a pulsed air cannon incorporating 3 1-gallon air tanks and a pulse valve. The pulse valve used in Example 1 was a Dwyer model DCV-50T1D shown in FIGS. 12a and 12c. FIG. 12b shows a Dwyer model DCV-62T1D, which is slightly larger. This concept tested the use of a pulsed air cannon and up to 3 1-gallon air tanks supplying the pulse valve in order to evaluate the optimum air volume released from the pulse valve. Following is a glossary of additional terms used in Table 3:

# of Air Tanks Activated—number of air tanks out of the 3 1-gallon tanks that were used to supply the pulse valve;

Tank Air Supply Pressure—regulated air supply pressure to the air tanks;

Valve PopUp Pressure—pressure within the air tanks at which a switch integrated with the air tanks would trigger a release of the pulse valve;

Pulse Cycle Time—cumulative amount of time that all pulses of air were directed at the filter face;

Time Between Pulses—amount of time in between individual pulses of air during the cycle;

Valve/Tanks ON—number of tanks used to supply air to the pulse valve;

Valve/Tanks OFF—number of tanks turned off and not supplying air to the pulse valve.

Example 2

Pressure Drop vs. Soot Load

Calculations on the pressure drop of a gas flowing through a porous material are expressed by Darcy's Law and Forchheimer's Extension. For more practical application, an empirical determined formula is applied and evolved into a simplified mathematical expression. It is well known that the specific pressure drop across a DPF is a function of soot loading, as illustrated in FIG. 5. For soot loading less than 1 g/filter liter, the slope of line is greater than that in soot loading greater than 1 g/liter. In practice, the 1 g/liter loading is relatively low (normally at deep-bed filtration stage, so the loading is mostly on the porous wall instead of cell channel) and negligible. Soot or ash loading will commonly be greater than 1 g/liter before DPF needs to be removed from vehicle for regeneration.

Equation (1) models the pressure drop:

$$\Delta P_{loaded} = \Delta P_0 + Q \cdot M \cdot K \quad (1)$$

Where Q is exhaust volumetric flow rate, M is mass of soot loading and K is a constant, which corresponds to gas flow

TABLE 3

Data showing the results of Example 1 testing Concept 5 (Pulse Valve)
Concept 5

|  | Test 1 | Test 2 | Test 3 | Test 4 | Test 5 | Test 6 | Test 7 | Test 8 | Test 9 | Test 10 | Test 11 | Test 12 |
|---|---|---|---|---|---|---|---|---|---|---|---|---|
| # of Air Tanks Activated | 1 | 1 | 2 | 2 | 3 | 3 | 1 | 2 | 3 | 1 | 2 | 3 |
| Tank Air Supply Pressure [psi] | 40 | 60 | 40 | 60 | 40 | 60 | 40 | 40 | 40 | 60 | 60 | 60 |
| Valve PopUp Pressure (psi) | 10 | 10 | 10 | 10 | 10 | 10 | 10 | 10 | 10 | 10 | 10 | 10 |
| Pulse Cycle Time [min]: | 10 | 10 | 10 | 10 | 10 | 10 | 10 | 10 | 10 | 10 | 10 | 10 |
| Time Between Pulses [sec]: | 5 | 5 | 5 | 5 | 5 | 5 | 5 | 5 | 5 | 5 | 5 | 5 |
| #Valve/Tanks ON: | 1 | 1 | 2 | 2 | 3 | 3 | 1 | 2 | 3 | 1 | 2 | 3 |
| #Valve/Tanks OFF: | 2 | 2 | 1 | 1 | 0 | 0 | 2 | 1 | 0 | 2 | 1 | 0 |
| Initial PM Loading (g) | 118 | 119 | 118 | 115 | 120 | 118 | 118 | 118 | 120 | 119 | 115 | 118 |
| Total PM Removed (g) | 81 | 98 | 90 | 97 | 87 | 83 | 81 | 90 | 87 | 98 | 97 | 83 |
| Efficiency | 69% | 82% | 76% | 84% | 73% | 70% | 69% | 76% | 73% | 82% | 84% | 70% | temperature and porous material properties, such as: porosity, pore size and wall thickness. $\Delta P_0$ is the DPF pressure drop of a clean filter, or the clean DPF baseline. If we select volumetric flow rate as another constant, then ($\Delta P_{loaded} - \Delta P_0$) versus soot load is a linear relationship as illustrated in FIG. 6.

Figure 7:
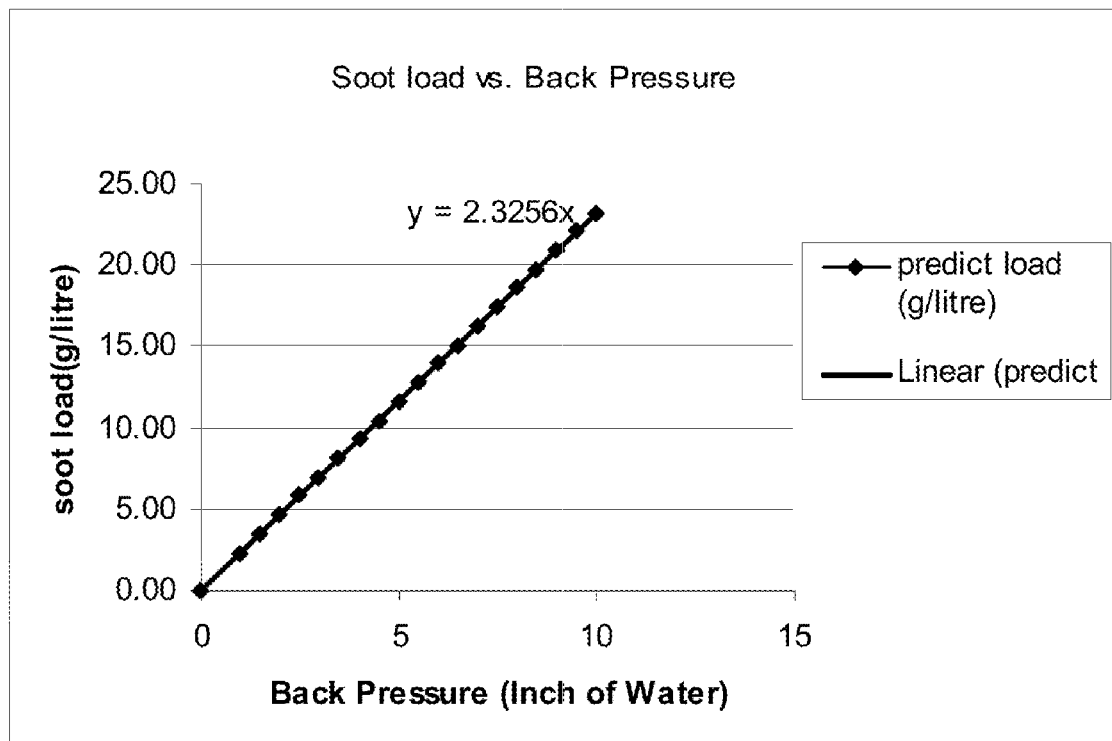
FIG. 7 shows the results of a study comparing soot load versus back pressure.

In this example, sample pressure drops were taken at various soot loads where $\Delta P$ is differential pressure across DPF inlet and outlet for a plugged filter, and $\Delta P0$ is the clean DPF differential pressure baseline. The data is presented in Table 4 and FIG. 7 for tests done on an Ibiden 9 inch by 12 inch silicon carbide filter.

TABLE 4

Data from Example 2 for Pressure Drop vs. Soot Load

| $\Delta P - \Delta P_0$ | Soot load (g/litre) |
|---|---|
| 0 | 0.00 |
| 1 | 2.33 |
| 1.5 | 3.49 |
| 2 | 4.65 |
| 2.5 | 5.81 |
| 3 | 6.98 |
| 3.5 | 8.14 |
| 4 | 9.30 |
| 4.5 | 10.47 |
| 5 | 11.63 |
| 5.5 | 12.79 |
| 6 | 13.95 |
| 6.5 | 15.12 |
| 7 | 16.28 |
| 7.5 | 17.44 |
| 8 | 18.60 |
| 8.5 | 19.77 |
| 9 | 20.93 |
| 9.5 | 22.09 |
| 10 | 23.26 |

Example 3

$T_{2S}$ vs. $T_C$

Figure 8:
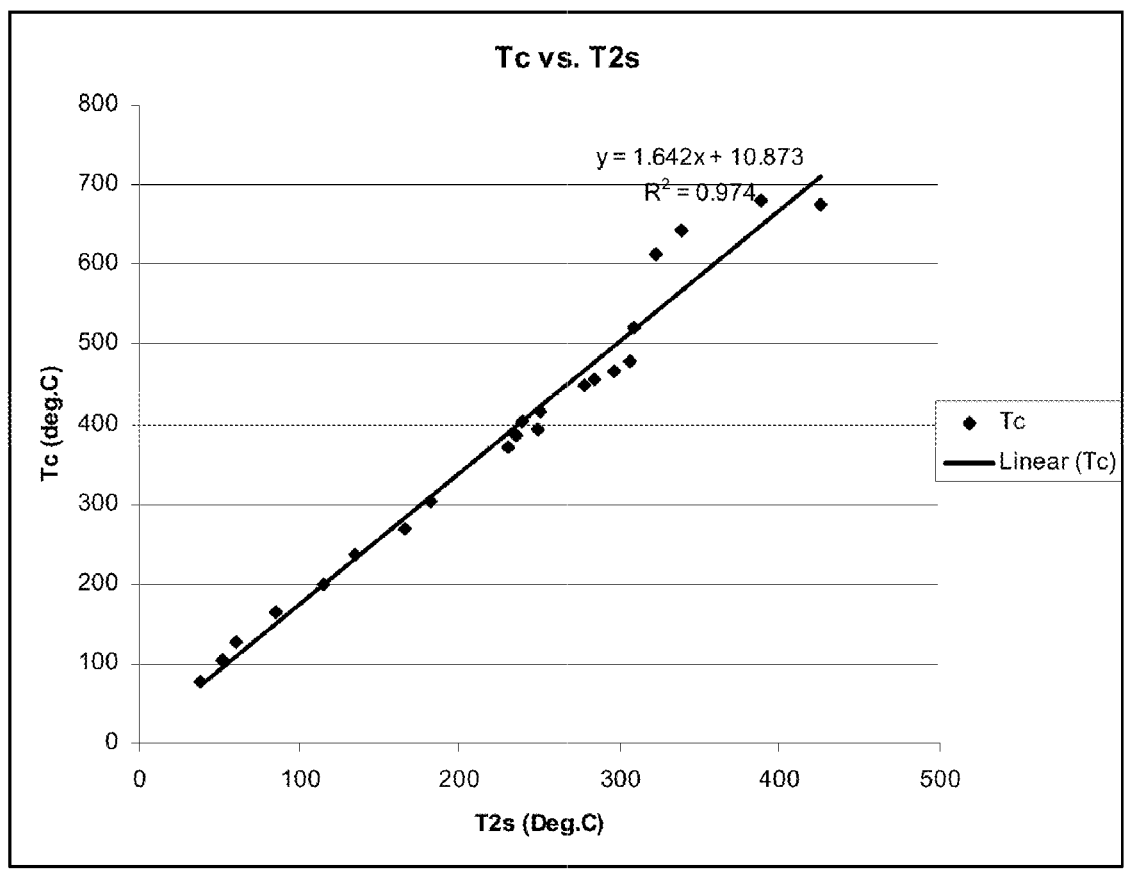
FIG. 8 shows the results of a study comparing core temperature to outlet temperature.

T1 is the temperature at the inlet of the DPF, near the heating element surface, $T_{2C}$ is the outlet temperature of a clean DPF, $T_{2S}$ is the outlet temperature of a soot loaded DPF, and $T_C$ is the core temperature of a DPF. A thermocouple measured the temperature at the axial and radial center ("core temperature") of the DPF, $T_C$, while another thermocouple measured $T_{2S}$. The filter was loaded to from about 8 to about 10 grams/L of PM. The data is shown in Table 5 and FIG. 8 for tests done on an Ibiden 9 inch by 12 inch silicon carbide filter.

TABLE 5

Data from Example 4 for $T_{2S}$ vs. $T_C$

| $T_{2S}$ | $T_c$ |
|---|---|
| 38 | 77 |
| 52 | 104 |
| 61 | 127 |
| 85 | 164 |
| 116 | 199 |
| 135 | 236 |
| 166 | 269.5 |
| 182 | 304 |
| 231 | 371.5 |
| 236 | 386 |
| 249 | 394.5 |
| 239 | 403 |
| 250 | 416.5 |

TABLE 5-continued

Data from Example 4 for $T_{2S}$ vs. $T_C$

| $T_{2S}$ | $T_c$ |
|---|---|
| 278 | 448 |
| 284 | 456.5 |
| 297 | 466 |
| 307 | 479 |
| 309 | 522 |
| 323 | 613.5 |
| 339 | 642 |
| 388 | 681 |
| 426 | 674.5 |

Example 4

Peak $T_{2S}$ vs. Pressure Drop

Figure 9:
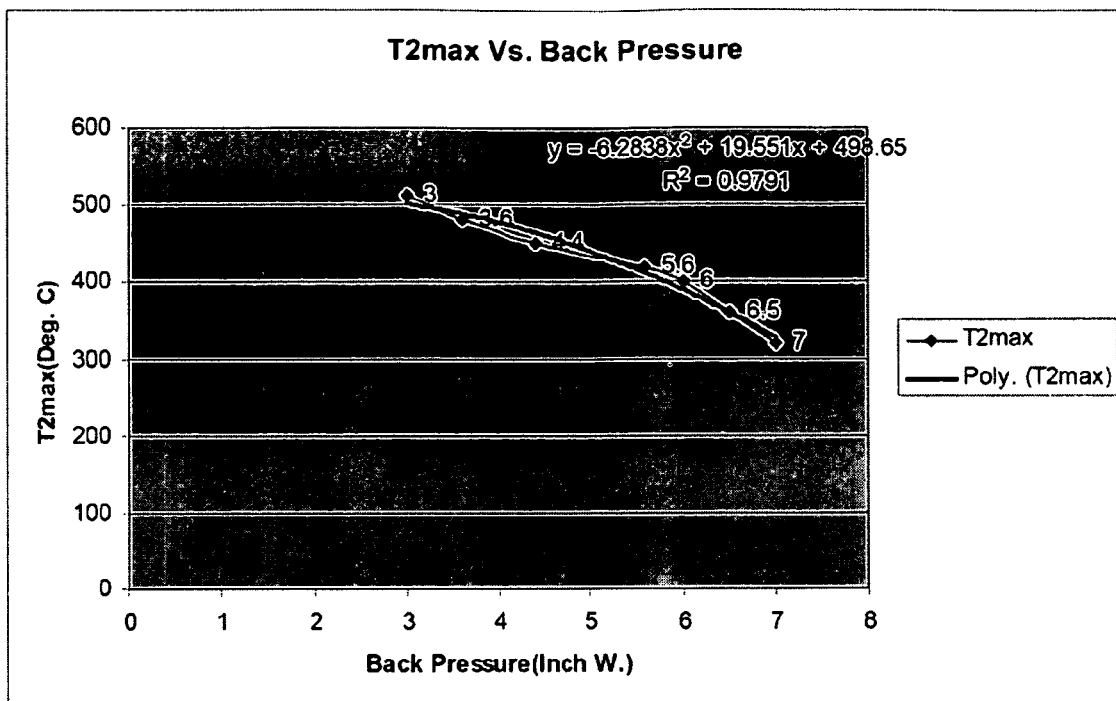
FIG. 9 shows the results of a study comparing outlet temperature versus back pressure (PM load) to maintain a core temperature of less than 1000° C.

A series of experiments were run where thermocouples were placed in DPF's (13 liter silicon carbide DPF) of varying soot loads. It was experimentally determined what $T_{2S}$ was necessary to keep the core at a set temperature of less than 1000° C. at varying soot loads. The data is shown in Table 6 and FIG. 9 for tests done on an Ibiden 9 inch by 12 inch silicon carbide filter.

TABLE 6

Data from Example 5 for Peak $T_{2S}$ vs. Pressure Drop

| $\Delta P - \Delta P_0$ | Peak T2S |
|---|---|
| 3 | 510 |
| 3.6 | 480 |
| 4.4 | 450 |
| 5.6 | 420 |
| 6 | 400 |
| 6.5 | 360 |
| 7 | 320 |
| >7.0 | 290 |

Example 5

P&ID of an Embodiment

Figure 4:
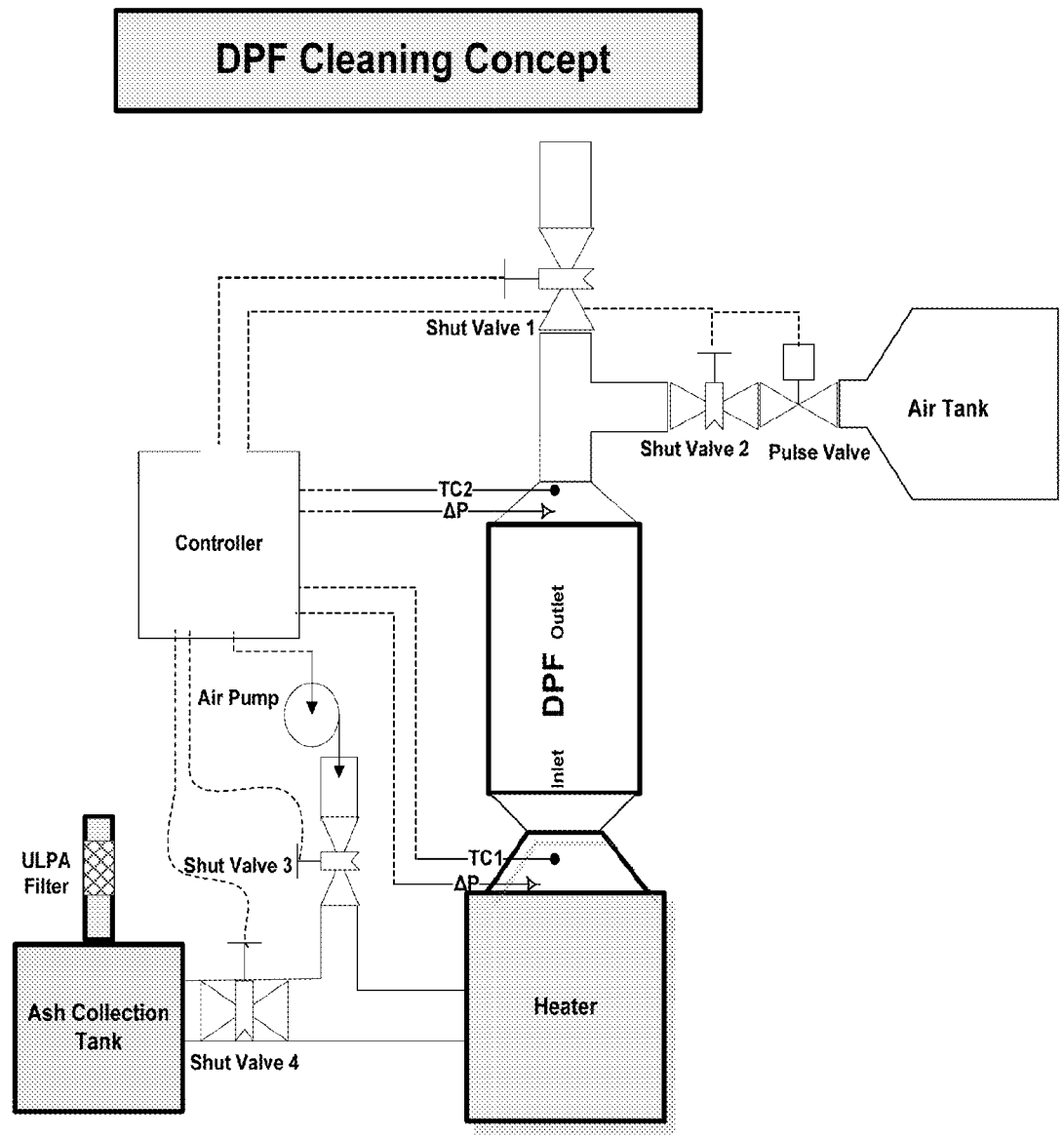
FIG. 4 shows a piping and instrumentation diagram (P&ID) of an embodiment of the apparatus for cleaning a DPF.

FIG. 4 depicts a piping and instrumentation diagram (P&ID) of an embodiment of a system of the present disclosure.

Air Pulsing Process: valves 1 & 3 close and valves 2 & 4 open to allow pulsed air to pass from Air Tank to DPF outlet side to Ash Collection Tank. Pulse valve works as an air jet to blow out ash and soot mix with compressed air pulses while particles get collected in the ash collection tank which is vented out through a 0.1 mm Ultra-Low Penetration Air (ULPA) filter of 99% efficiency.

Heating Process: valve 1 opens and valves 2, 3 & 4 close to allow heated air to pass through DPF inlet side to the outside ventilation.

DPF Differential Monitoring: valves 1 & 3 open and valves 2 & 4 close to allow the air blower to flow air through the DPF inlet side to the outside ventilation. Pressure drop values are recorded throughout the cleaning process, after 1st pulse cycle, after heating cycle and after the final pulse cycle. These values will determine the progress of the cleaning process and the final cleaning efficiency assessment:

$$\text{cleaning efficiency} = \frac{loading_1 - loading_2}{loading_1} \times 100\%$$

In this case, $loading_1$ and $loading_2$ are measures of the pressure drop across the filter where $loading_1$ is taken before a cleaning program and $loading_2$ is taken after a cleaning program. Cleaning efficiency can also be measured by weight instead of pressure drop with this equation.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A method of regenerating a carbon filter, comprising:
    placing the carbon filter in an apparatus comprising a filter receptacle; and
    performing a fluid cleaning program on the carbon filter in the receptacle, comprising:
        directing a fluid substantially at a first face of the carbon filter;
        redirecting the fluid substantially at a second face of a carbon filter; and
        repeating the directing and the redirecting alternately for a period of time effective for regenerating the carbon filter,
    further comprising heating the carbon filter after performing the fluid cleaning program, wherein the heating the carbon filter comprises
        heating the fluid and
        blowing the heated fluid into one of the first and the second face of the carbon filter to a maximum core temperature,
        wherein the heating the carbon filter comprises increasing a temperature of the blowing heated fluid at a rate to provide for uniform expansion while avoiding thermal shock and soaking the carbon filter at the maximum core temperature for a set amount of time.

2. The method of claim 1, wherein a first pressure of the fluid during directing is greater than a second pressure of the fluid during redirecting.

3. The method of claim 2, wherein the apparatus further comprises: a reservoir tank; and a pulse valve in communication with the reservoir tank, wherein the reservoir tank contains the fluid, and further wherein the directing comprises the pulse valve directing pulses of the fluid substantially at the first face of the carbon filter.

4. The method of claim 3, wherein the directing comprises directing pulses of the fluid substantially at the first face, and the pulse valve releases when a pressure inside the reservoir tank reaches a pressure of from about 40 to about 125 psi.

5. The method of claim 3, wherein the directing comprises directing pulses of the fluid substantially at the first face, and the pulse valve releases when a pressure inside the reservoir tank reaches a pressure of from about 60 to about 80 psi.

6. The method of claim 3, wherein the machine further comprises a blower, and wherein the redirecting comprises the blower redirecting the fluid.

7. The method of claim 6, wherein the redirecting is at a pressure from about 0.5 to about 20 psi.

8. The method of claim 6, wherein the redirecting is at a pressure from about 1 to about 5 psi.

9. The method of claim 6, wherein the first face is an outlet face of the carbon filter, and the second face is an inlet face of the carbon filter.

10. The method of claim 1, further comprising measuring particulate matter loading after performing the fluid cleaning program.

11. The method of claim 10, wherein a pressure of the fluid during directing is greater than a pressure of the fluid during redirecting.

12. The method of claim 11, further comprising heating the carbon filter after performing the fluid cleaning program.

13. The method of claim 1, further comprising heating the carbon filter after performing the fluid cleaning program.

14. The method of claim 13, wherein a first pressure of the fluid during directing is greater than a second pressure of the fluid during redirecting.

15. The method of claim 13, wherein the heating the carbon filter comprises heating the fluid and blowing the heated fluid into one of the first and the second face of the carbon filter.

16. The method of claim 15, wherein the heating the carbon filter comprises heating the carbon filter to a maximum core temperature of less than about 650° C.

17. The method of claim 16, wherein the heating the carbon filter comprises increasing a temperature of the blowing heated fluid at a rate of from about 7 to about 10° C. per minute.

18. A method of regenerating a carbon filter, comprising:
    placing the carbon filter in an apparatus comprising a filter receptacle; and
    performing a fluid cleaning program on the carbon filter in the receptacle, comprising:
        directing a fluid substantially at a first face of the carbon filter;
        redirecting the fluid substantially at a second face of a carbon filter; and
        repeating the directing and the redirecting alternately for a period of time effective for regenerating the carbon filter,
    further comprising heating the carbon filter after performing the fluid cleaning program,
    wherein the heating the carbon filter comprises heating the fluid and blowing the heated fluid into one of the first and the second face of the carbon filter, the heating the carbon filter comprises heating the carbon filter to a maximum core temperature of less than about 650° C., the heating the carbon filter comprises increasing a temperature of the blowing heated fluid at a rate of from about 7 to about 10° C. per minute, and
    wherein the heating the carbon filter comprises soaking the carbon filter at the maximum core temperature for from about 1 to about 2 hours.

19. The method of claim 18, further comprising cooling the carbon filter from the maximum core temperature to less than about 50° C. at a rate of from about 10 to about 12° C. per minute.

20. The method of claim 17, wherein the heating the carbon filter is stopped when the temperature of the fluid exiting the carbon filter increases at a rate greater than about 10° C. per second.

21. The method of claim 19, further comprising measuring particulate matter loading.

22. The method of claim 21, further comprising repeating the fluid cleaning program if the PM load is greater than the standard PM load.

23. The method of claim 1, where the carbon filter comprises a diesel particulate filter.

24. The method of claim 1, where the fluid is a compressible fluid.

25. The method of claim 1, where the fluid is selected from a group consisting of air, nitrogen, oxygen, argon, water, saline, steam, and mixtures of any thereof.

26. The method of claim 4, where the reservoir tank is a tank with a volume from about 1 to about 2 gallons.

* * * * *